US011629246B2

(12) United States Patent
Cho et al.

(10) Patent No.: US 11,629,246 B2
(45) Date of Patent: *Apr. 18, 2023

(54) POWER CABLE

(71) Applicant: LS CABLE & SYSTEM LTD., Anyang-si (KR)

(72) Inventors: Young Eun Cho, Seoul (KR); Gi Joon Nam, Seoul (KR); Sue Jin Son, Anyang-Si (KR); Min Sang Cho, Seoul (KR); Jung In Shin, Hwaseong-Si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/055,444

(22) PCT Filed: Jun. 4, 2019

(86) PCT No.: PCT/KR2019/006719
§ 371 (c)(1),
(2) Date: Nov. 13, 2020

(87) PCT Pub. No.: WO2020/009336
PCT Pub. Date: Jan. 9, 2020

(65) Prior Publication Data
US 2021/0179829 A1    Jun. 17, 2021

(30) Foreign Application Priority Data

Jul. 3, 2018 (KR) .......... 10-2018-0077047
Nov. 28, 2018 (KR) .......... 10-2018-0150056

(51) Int. Cl.
*C08L 23/12* (2006.01)
*C08L 23/14* (2006.01)
(Continued)

(52) U.S. Cl.
CPC ............ *C08L 23/12* (2013.01); *C08L 23/142* (2013.01); *H01B 3/441* (2013.01); *C08L 2207/02* (2013.01); *H01B 9/00* (2013.01)

(58) Field of Classification Search
CPC ................. C08L 23/12; H01B 3/307
See application file for complete search history.

(56) References Cited

U.S. PATENT DOCUMENTS 5,302,454 A * 4/1994 Cecchin .............. C08F 297/086
428/402
6,461,703 B1 * 10/2002 Rigosi .................... C08L 23/10
428/36.9

(Continued)

FOREIGN PATENT DOCUMENTS

CN      104810086 A     7/2015
CN      105960431 A     9/2016
(Continued)

OTHER PUBLICATIONS

Chinese Office Action for related Chinese Application No. 201980029341.2; action dated Mar. 24, 2021; (5 pages).
(Continued)

*Primary Examiner* — Liam J Heincer
(74) *Attorney, Agent, or Firm* — K&L Gates LLP

(57) ABSTRACT

Provided is a power cable including an insulating layer formed of an insulating material that is environmentally friendly and has not only high heat resistance and mechanical strength but also excellent flexibility, bendability, impact resistance, thermal stability, cold resistance, installability, workability, etc., which are trade-off with the physical properties.

9 Claims, 2 Drawing Sheets

(51) Int. Cl.
  *H01B 3/44* (2006.01)
  *H01B 9/00* (2006.01)

(56) References Cited

U.S. PATENT DOCUMENTS

| | | | |
|---|---|---|---|
| 6,861,143 B2 | 3/2005 | Castellani et al. | |
| 7,592,393 B2* | 9/2009 | Pelliconi | C08F 210/06 525/191 |
| 2003/0105239 A1* | 6/2003 | Collina | C08L 53/00 525/240 |
| 2005/0113521 A1* | 5/2005 | Pelliconi | C08L 23/08 525/240 |
| 2005/0222314 A1* | 10/2005 | Credali | C08L 23/10 524/423 |
| 2005/0234198 A1* | 10/2005 | Tian | C08F 10/00 525/240 |
| 2008/0207835 A1* | 8/2008 | Vestberg | C08L 23/10 525/240 |
| 2010/0282492 A1* | 11/2010 | Machi | C08L 23/10 174/113 R |
| 2011/0054110 A1* | 3/2011 | Ter Woort | C08L 23/10 524/528 |
| 2014/0045998 A1* | 2/2014 | Ceccarani | C08L 23/06 525/240 |
| 2014/0087186 A1* | 3/2014 | Goberti | C08K 3/00 428/375 |
| 2014/0155554 A1* | 6/2014 | Massari | C08L 23/0815 525/240 |
| 2014/0158244 A1* | 6/2014 | Lunghi | C08L 23/0807 138/98 |
| 2018/0094128 A1* | 4/2018 | Hrachova | C08L 23/12 |
| 2020/0251244 A1* | 8/2020 | Koelblin | C08K 5/18 |
| 2020/0308353 A1* | 10/2020 | Jerabek | D02G 3/18 |
| 2020/0350095 A1* | 11/2020 | Cho | H01B 3/441 |

FOREIGN PATENT DOCUMENTS

| | | |
|---|---|---|
| CN | 106409393 A | 2/2017 |
| EP | 0893801 A1 | 1/1999 |
| JP | 2012134136 A | 7/2012 |
| KR | 1019990014105 A | 2/1999 |
| KR | 1020140102407 A | 8/2014 |
| KR | 20140134836 A | 11/2014 |
| KR | 1020160119769 | 10/2016 |
| KR | 20180001993 A | 1/2018 |
| KR | 1020180007762 A | 1/2018 |
| KR | 20180013507 A | 2/2018 |
| KR | 101859852 B1 | 5/2018 |

OTHER PUBLICATIONS

International Search Report for related International Application No. PCT/KR2019/006719; report dated Jan. 9, 2020; (7 pages).
Written Opinion for related International Application No. PCT/KR2019/006719; report dated Jan. 9, 2020; (5 pages).
Korean Office Action for related Korean Application No. 10-2018-0150056; action dated Apr. 2, 2019; (13 pages).
Korean Office Action for related Korean Application No. 10-2018-0150056; action dated Aug. 26, 2019; (13 pages).
Extended European Search Report for related European Application No. 19831376.9; action dated Feb. 22, 2022 (7 pages).

* cited by examiner ent cont
POWER CABLE

CROSS-REFERENCE TO RELATED APPLICATIONS

The present application is a National Stage of International Application No. PCT/KR2019/006719 filed on Jun. 4, 2019, which claims the benefit of Korean Patent Application No. 10-2018-0077047 filed on Jul. 3, 2018, and Korean Patent Application No. 10-2018-0150056 filed Nov. 28, 2018, filed with the Korean Intellectual Property Office, the entire contents of each hereby incorporated by reference.

FIELD

The present disclosure relates to a power cable. Specifically, the present disclosure relates to a power cable including an insulating layer formed of an insulating material that is environmentally friendly and has not only high heat resistance and mechanical strength but also excellent flexibility, bendability, impact resistance, thermal stability, cold resistance, installability, workability, etc., which are trade-off with the physical properties.

BACKGROUND

In general, a power cable includes a conductor and an insulating layer surrounding the conductor. Particularly, a high-voltage or ultra-high-voltage power cable may further include an inner semiconducting layer between the conductor and the insulating layer, an outer semiconducting layer surrounding the insulating layer, a sheath layer surrounding the outer semiconducting layer, and the like.

In recent years, as the demand for electrical power has increased, the development of high-capacity cables has been required. To this end, an insulating material necessary to manufacture an insulating layer having excellent mechanical and electrical properties is needed.

Generally, a polyolefin polymer such as polyethylene, ethylene/propylene elastic copolymer (EPR), or ethylene/propylene/diene copolymer (EPDM) has been cross-linked and used as a base resin of the insulating material. This is because such a general cross-linked resin maintains excellent flexibility, satisfactory electrical and mechanical strength, etc. even at high temperatures.

However, because cross-linked polyethylene (XLPE) or the like used as the base resin of the insulating material is in a cross-linked form, when the lifespan of a cable or the like including an insulating layer formed of a resin such as XLPE ends, the resin of the insulating layer cannot be recycled and should be disposed by incineration and thus is not environmentally friendly.

When polyvinyl chloride (PVC) is used as a material of a sheath layer, PVC is difficult to separate from the cross-linked polyethylene (XLPE) constituting the insulating material or the like and is not environmentally friendly because toxic chlorinated substances are generated during incineration.

Non-cross-linked high-density polyethylene (HDPE) or low-density polyethylene (LDPE) is environmentally friendly because a resin of an insulating layer formed thereof is recyclable when the lifespan of a cable including the insulating layer ends, but is inferior to XLPE in terms of heat resistance and thus is of limited use due to low operating temperatures.

A polypropylene resin may be used as a base resin, because it is excellent in heat resistance without being cross-linked due to a polymer thereof having a melting point of 160° C. or higher and thus is environmentally friendly. However, the polypropylene resin has insufficient flexibility, bendability and the like due to high rigidity and thus workability is low during laying of a cable including an insulating layer formed thereof and is of limited use.

Therefore, there is an urgent need for a power cable which is environmentally friendly, is inexpensive to manufacture, and satisfies not only heat resistance and mechanical strength but also flexibility, bendability, impact resistance, thermal stability, cold resistance, installability, workability, etc. which are in trade-off with heat resistance and mechanical strength.

SUMMARY

The present disclosure is directed to providing an eco-friendly power cable.

The present disclosure is also directed to providing a power cable including an insulating layer which satisfies not only heat resistance and mechanical strength but also flexibility, bendability, impact resistance, thermal stability, cold resistance, installability, workability, etc. which are in trade-off with heat resistance and mechanical strength.

According to an aspect of the present disclosure, provided is an insulating composition comprising a heterophasic polypropylene resin, wherein an insulating sample formed of the insulating composition has a flexural modulus of 50 to 1,200 MPa at room temperature, measured according to the ASTM D790 standard, and a peak ratio of a propylene monomer is in a range of 0.3 to 2.0 according to the following Equation 1 and xylene insolubility is in a range 10% or less according to the following Equation 2:

peak ratio=peak of $CH_3$ symmetric bend/peaks of $CH_2$ and $CH_3$ bends,     [Equation 1]

wherein the peak of $CH_3$ symmetry bend represents an absorption peak value with respect to the $CH_3$ symmetry bend between 1400 $cm^{-1}$ and 1340 $cm^{-1}$, which are wave numbers indicating a propylene monomer in an FT-IR analysis of the insulating composition, and the peaks of $CH_2$ and $CH_3$ bends represent absorption peak values with respect to $CH_2$ and $CH_3$ bends between 1500 $cm^{-1}$ and 1420 $cm^{-1}$, which are wave numbers respectively indicating an ethylene monomer and a propylene monomer in the FT-IR analysis of the insulating composition, and xylene insolubility=(mass of insulating sample after eluted with xylene solvent/mass of insulating sample before eluted)×100,     [Equation 2]

wherein the mass of insulating sample after eluted with xylene solvent represents mass of an insulating sample, measured after 0.3 grams of the insulating sample is immersed into a xylene solvent, heated at a boiling point or higher for six hours, cooled to room temperature, taken out of the xylene solvent, dried in an oven at 150° C. for four hours, and cooled to the room temperature.

According to another aspect of the present disclosure, provided is the insulating composition, wherein the peak ratio of the propylene monomer according to Equation 1 above is in a range of 0.4 to 1.7.

According to another aspect of the present disclosure, provided is the insulating composition, wherein the xylene insolubility according to Equation 2 above is 8% or less.

According to another aspect of the present disclosure, provided is the insulating composition, wherein the flexural modulus is in a range of 200 to 1,000 MPa.

According to another aspect of the present disclosure, provided is the insulating composition, wherein, in the heterophasic polypropylene resin, a rubbery propylene copolymer is dispersed in a crystalline polypropylene matrix.

According to another aspect of the present disclosure, provided is the insulating composition, wherein the crystalline polypropylene matrix comprises at least one of a propylene homopolymer and a propylene copolymer.

According to another aspect of the present disclosure, provided is the insulating composition, wherein the rubbery propylene copolymer comprises at least one comonomer selected from the group consisting of ethylene and $C_{4-12}$ alpha-olefins such as 1-butene, 1-pentene, 4-methyl-1-pentene, 1-hexene, 1-heptene, 1-octene, and the like.

According to another aspect of the present disclosure, provided is a power cable comprising a conductor and an insulating layer surrounding the conductor, wherein the insulating layer is formed of the insulating composition.

A power cable according to the present disclosure employing a non-cross-linked propylene polymer as a material of an insulating layer is environmentally friendly, has excellent heat resistance and mechanical strength, and at the same time satisfies flexibility, bendability, impact resistance, thermal stability, cold resistance, installability, workability, etc. which are in trade-off with heat resistance and mechanical strength.

DETAILED DESCRIPTION

Hereinafter, exemplary embodiments of the present disclosure will be described in detail. The present disclosure is, however, not limited thereto and may be embodied in many different forms. Rather, the embodiments set forth herein are provided so that this disclosure may be thorough and complete and fully convey the scope of the disclosure to those skilled in the art. Throughout the specification, the same reference numbers represent the same elements.

Figure 1:
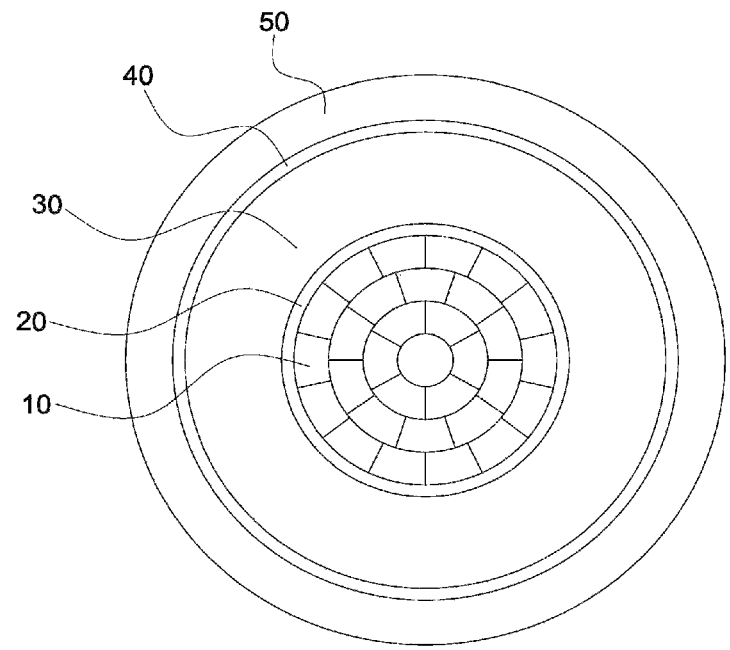
FIG. 1 is a schematic cross-sectional view of a power cable according to an embodiment of the present disclosure.
Figure 2:
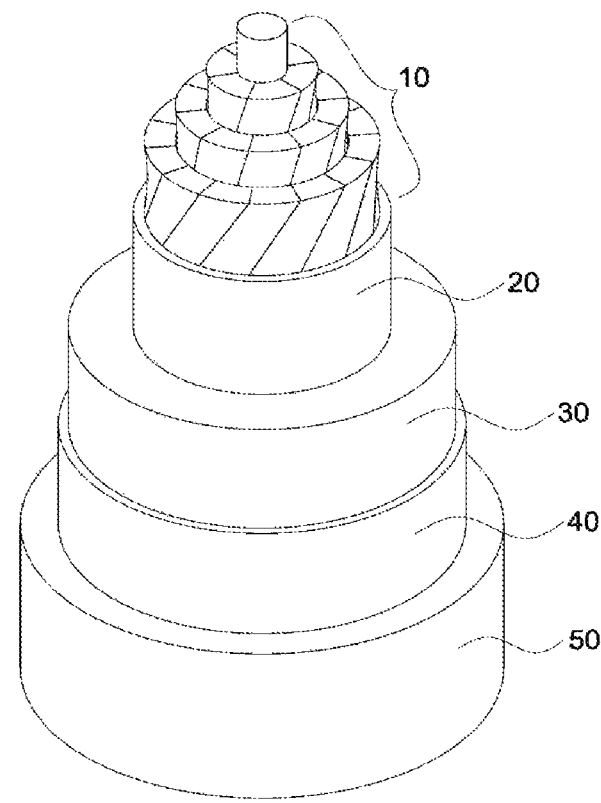
FIG. 2 is a schematic view of a longitudinal section of the power cable of FIG. 1.

FIGS. 1 and 2 illustrate a cross section and a longitudinal section of a power cable according to an embodiment of the present disclosure, respectively.

As illustrated in FIGS. 1 and 2, the power cable according to the present disclosure may include a conductor 10 formed of a conductive material such as copper or aluminum, an insulating layer 30 surrounding the conductor 10 and formed of an insulating polymer or the like, an inner semiconducting layer 20 surrounding the conductor 10 and configured to remove an air layer between the conductor 10 and the insulating layer 30 and reduce local electric field concentration, an outer semiconducting layer 40 configured to shield the power cable and cause a uniform electric field to be applied to the insulating layer 30, a sheath layer 50 for protecting the power cable, and the like.

Specifications of the conductor 10, the insulating layer 30, the semiconducting layers 20 and 40, the sheath layer 50, and the like may vary according to a purpose of the power cable, a transmission voltage or the like, and materials of the insulating layer 30, the semiconducting layers 20 and 40, and the sheath layer 50 may be the same or different.

The conductor 10 may be formed by twisting a plurality of stranded wires to improve flexibility, bendability, installability, workability, etc. of the power cable, and particularly include a plurality of conductor layers formed by arranging a plurality of stranded wires in a circumferential direction of the conductor 10.

The insulating layer 30 of the power cable according to the disclosure may be formed of an insulating composition including a non-cross-linked thermoplastic resin such as a polypropylene copolymer, e.g., heterophasic polypropylene containing resins with two or more phases, e.g., a crystalline resin and a rubbery resin, and particularly, a heterophasic polypropylene resin in which a rubbery polypropylene copolymer is dispersed in a crystalline polypropylene matrix resin.

Here, the crystalline polypropylene matrix may include a propylene homopolymer and/or a propylene copolymer, preferably the propylene homopolymer, and more preferably only the propylene homopolymer. The propylene homopolymer refers to polypropylene formed by polymerization of propylene contained in an amount of 99 wt % or more and preferably an amount of 99.5 wt % or more, based on the total weight of monomers.

The crystalline polypropylene matrix may be polymerized in the presence of a general stereospecific Ziegler-Natta catalyst, a metallocene catalyst, a constrained geometry catalyst, another organometallic or coordination catalyst, and preferably, in the presence of the Ziegler-Nana catalyst or the metallocene catalyst. Here, the metallocene is a generic term for bis(cyclopentadienyl) metal which is a new organometallic compound in which cyclopentadiene and a transition metal are combined in a sandwich structure, and a simplest general formula thereof is $M(C_5H_5)_2$ (here, M represents Ti, V, Cr, Fe, Co, Ni, Ru, Zr, Hf or the like). The polypropylene polymerized in the presence of the metallocene catalyst has a low catalyst residual amount of about 200 to 700 ppm and thus may suppress or minimize a decrease in electrical properties of the insulating composition containing the polypropylene due to the low catalyst residual amount.

The rubbery propylene copolymer dispersed in the crystalline polypropylene matrix is substantially amorphous. The rubbery propylene copolymer may include at least one comonomer selected from the group consisting of ethylene and $C_{4-12}$ alpha-olefins such as 1-butene, 1-pentene, 4-methyl-1-pentene, 1-hexene, 1-heptene, and 1-octene.

The rubbery propylene copolymer may be monomeric propylene-ethylene rubber (PER) or propylene-ethylene diene rubber (EPDM).

In the present disclosure, the rubbery propylene copolymer may have a micro or nano particle size. The particle size of the rubbery propylene copolymer may ensure uniform dispersion of the rubbery propylene copolymer in the crystalline polypropylene matrix and improve impact strength of the insulating layer including the rubbery propylene copolymer. In addition, a risk of fissures initiated by the particles may reduce and a possibility that propagation of already formed fissures or cracks will stop may increase due to the particle size of the rubbery propylene copolymer.

Because the heterophasic polypropylene resin has a high melting point in spite of the non-cross-linked form thereof, the heterophasic polypropylene resin exhibits heat resistance sufficient to provide a power cable with an improved continuous workable temperature range and is environmentally friendly because it is recyclable due to the non-cross-linked form. In contrast, a general cross-linked resin is difficult to be recycled and thus is not environmentally friendly, and does not guarantee uniform productivity when cross-linking or scorching occurs early during formation of the insulating layer 30, thereby reducing long-term extrudability.

In the present disclosure, the insulating composition used to form the insulating layer 30 may further include a nucleating agent. The nucleating agent may be a sorbitol-based nucleating agent. That is, the nucleating agent is a sorbitol-based nucleating agent, for example, 1,3:2,4-bis(3,4-dimethyldibenzylidene) sorbitol, bis(p-methyldibenzulidene) sorbitol, substituted dibenzylidene sorbitol, or a mixture thereof.

Due to the nucleating agent, curing of the non-cross-linked thermoplastic resin may be promoted even when not quenched in an extrusion process of the power cable, thus improving productivity of the power cable, a size of crystals generated during the curing of the non-cross-linked thermoplastic resin may be reduced to preferably 1 to 10 μm, thereby improving electrical properties of an insulating layer to be formed, and a plurality of crystallization sites of the crystals may be formed to increase crystallinity, thereby improving both heat resistance and mechanical strength of the insulating layer.

Because a melting point of the nucleating agent is high, the nucleating agent should be injected and extruded at a high temperature of about 230° C., and it is preferable to use a combination of two or more sorbitol-based nucleating agents. When the combination of two or more different sorbitol-based nucleating agents is used, the expression of nucleating agent may be increased even at low temperatures.

The nucleating agent may be contained in an amount of 0.1 to 0.5 parts by weight, based on 100 parts by weight of the non-cross-linked thermoplastic resin. When the amount of the nucleating agent is less than 0.1 parts by weight, the heat resistance and electrical/mechanical strength of the non-cross-linked thermoplastic resin and the insulating layer including the same may decrease due to a large crystal size, e.g., a crystal size exceeding 10 μm and an uneven crystal distribution, whereas when the amount of the nucleating agent is greater than 0.5 parts by weight, a surface interface area between crystals and an amorphous portion of the resin may increase due to an extremely small crystal size, e.g., a crystal size of less than 1 μm and thus AC dielectric breakdown (ACBD) characteristics, impulse characteristics, and the like of the non-cross-linked thermoplastic resin and the insulating layer including the same may decrease.

In the present disclosure, the insulating composition used to form the insulating layer 30 may further include insulating oil.

Mineral oil, synthetic oil, or the like may be used as the insulating oil. In particular, the insulating oil may be an aromatic oil composed of an aromatic hydrocarbon compound such as dibenzyl toluene, alkylbenzene, or alkyldiphenylethane, a paraffinic oil composed of a paraffinic hydrocarbon compound, a naphthenic oil composed of a naphthenic hydrocarbon compound, silicone oil, or the like.

The insulating oil may be contained in an amount of 1 to 10 parts by weight and preferably 1 to 7.5 parts by weight, based on 100 parts by weight of the non-cross-linked thermoplastic resin. When the amount of the insulating oil is greater than 10 parts by weight, elution of the insulating oil may occur during extrusion of the insulating layer 30 on the conductor 10, thus making it difficult to process the power cable.

As described above, due to the insulating oil, the flexibility, bendability, etc. of the insulating layer 30 in which a polypropylene rein having relatively low flexibility due to high rigidity is employed as a base resin may be additionally improved, thereby facilitating laying of the power cable, and high heat resistance and mechanical and electrical properties of the polypropylene resin may be maintained or improved. Particularly, a reduction of processability of the polypropylene resin due to a slightly narrow molecular weight distribution when polymerized in the presence of a metallocene catalyst may be supplemented due to the insulating oil.

In the present disclosure, an insulating sample formed of the insulating composition, which is used to form the insulating layer 30, may have a flexural modulus of 50 to 1,200 MPa at room temperature (measured according to the ASTM D790 standard) and preferably 200 to 1,000 MPa, an FT-IR peak ratio of a propylene monomer may be in a range of 0.3 to 2.0 and preferably 0.4 to 1.7, and xylene insolubility may be 10% or less and preferably 8% or less.

Here, the flexural modulus may be measured according to the ASTM D790 standard by placing a cuboid insulating sample on two supports and measuring a load applied when surface rupture occurs in the insulating sample or when a deformation rate of the insulating sample is 5.0% while a load is applied to a midpoint on the insulating sample on the two supports. The heat resistance, mechanical properties, etc. of the insulating layer 30 may be insufficient when the flexural modulus of the insulating sample at room temperature is less than 50 MPa, and the flexibility, cold resistance, installability, workability, etc. thereof may significantly reduce when the flexural modulus of the insulating sample at room temperature is greater than 1,200 MPa.

The FT-IR peak ratio of the propylene monomer may be calculated by Equation 1 below.

$$\text{peak ratio} = \text{peak of } CH_3 \text{ symmetric bend/peaks of } CH_2 \text{ and } CH_3 \text{ bends} \quad \text{[Equation 1]}$$

Figure 3:
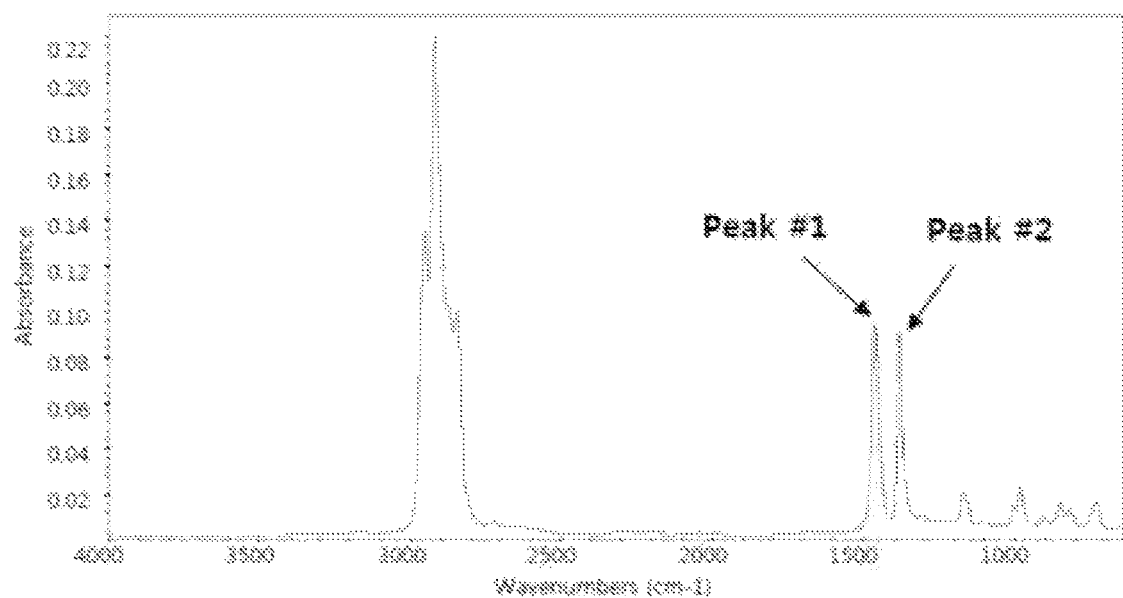
FIG. 3 is a graph showing a result of an FT-IR analysis of an insulating composition of a power cable according to the present disclosure.

In Equation 1 above, the "peak of $CH_3$ symmetric bend" (or an umbrella mode) represents an absorption peak value with respect to a $CH_3$ symmetric bend between 1400 $cm^{-1}$ and 1340 $cm^{-1}$, which are wave numbers indicating a propylene monomer in an FT-IR analysis of the insulating composition, i.e., a largest value among the wave numbers, as illustrated in FIG. 3; and the "peaks of $CH_2$ and $CH_3$ bends" represent absorption peak values with respect to $CH_2$ and $CH_3$ bends between 1500 $cm^{-1}$ to 1420 $cm^{-1}$, which are wave numbers respectively indicating an ethylene monomer and a propylene monomer in the FT-IR analysis of the insulating composition, i.e., largest values among the wave numbers, as illustrated in FIG. 3.

Here, the term "wave number" refers to a magnitude of a phase that changes per unit length of a wave.

That is, when the peak ratio of the propylene monomer is less than 0.3, heat resistance, mechanical properties, etc. of the insulating layer 30 formed of the insulating composition may be insufficient, whereas when the peak ratio of the propylene monomer is greater than 2.0, flexibility, cold resistance, installability, workability, etc. of the insulating layer 30 and a cable including the insulating layer 30 may greatly decrease.

The xylene insolubility may be calculated by Equation 2 below.

$$\text{xylene insolubility} = (\text{mass of insulating sample after eluted with xylene solvent/mass of insulating sample before eluted}) \times 100 \quad \text{[Equation 2]}$$

In Equation 2 above, the "mass of insulating sample after eluted with xylene solvent" represents the mass of an insulating sample, measured after 0.3 grams of the insulating sample is immersed in a xylene solvent, heated at a boiling point, e.g., 150° C., or more for six hours, cooled to room temperature, taken out of the xylene solvent, dried in an oven at 150° C. for four hours, and cooled to the room temperature.

That is, the mass of the insulating sample after eluted in the xylene solvent corresponds to the total mass of a crystalline polypropylene matrix and other additives that are left after a rubbery polypropylene copolymer eluted with the xylene solvent is removed from the insulating sample. Thus, when the xylene insolubility exceeds 10%, i.e., when the amount of a crystalline portion in the insulating sample is excessive, the flexibility, cold resistance, installability, workability, etc. of the insulating layer 30 may greatly reduce.

EXAMPLES

1. Preparation Example

Insulating compositions each having a peak ratio, a flexural modulus, and xylene insolubility shown in Table 1 below were prepared, and insulating samples each formed of one of the insulating compositions and cable samples each including an insulating layer formed of one of the insulating compositions were prepared.

TABLE 1

|  | Example | | | | Comparative example | | | |
|---|---|---|---|---|---|---|---|---|
|  | 1 | 2 | 3 | 4 | 1 | 2 | 3 | 4 |
| peak ratio | 1.39 | 0.90 | 1.51 | 1.28 | 0.29 | 1.79 | 2.06 | 2.43 |
| flexural modulus (MPa) | 600 | 350 | 850 | 550 | 45 | 1100 | 1450 | 1800 |
| xylene insolubility (%) | 1.55 | 3.89 | 6.23 | 2.37 | 0.38 | 10.17 | 9.04 | 13.21 |

2. Evaluation of Physical Properties

1) Evaluation of Flexibility

The cable samples of the Example and the Comparative Example were placed perpendicular to the ground, a test cylinders (diameter: 25(D+d); D: an outer diameter of a cable and d: a diameter of a conductor) was brought in contact with both sides of each of the cable samples, the cable samples were repeatedly bent at 180° three times in both directions along a circumferential curved surface of the test cylinder, and external appearances of the insulation layers of the cable samples were observed with the naked eye to determine whether there were bending, cracks, breakage, whitening, etc. It was determined that a cable sample was defective when any one of bending, cracks, breakage, and whitening was observed in the cable sample.

2) Evaluation of Mechanical Properties at Room Temperature

Tensile strength and elongation of each of the insulating samples of the Example and the Comparative Example were measured according to the KS C IEC 60811-501 standard. Tensile strength should be 1.27 kg/me or more and elongation should be 350% or more.

3) Evaluation of Mechanical Properties after Heated

The insulating samples of the Example and the Comparative Example were heated at 135±3° C. for 240 hours according to the NEN-HD 620 S2 standard, and thereafter, the tensile strength and elongation thereof were measured according to the KS C IEC 60811-501 standard. Tensile strength after heated should be 1.27 kg/me or more and elongation after heated should be 350% or more.

4) Evaluation of Cold Resistance

A brittle temperature of each of the insulating samples of the Example and the Comparative Example was measured according to the ASTM D746 standard. The brittle temperature should be −35° C. or less.

A result of the evaluation of the physical properties is as shown in Table 2 below.

TABLE 2

|  | Example | | | | Comparative example | | | |
|---|---|---|---|---|---|---|---|---|
|  | 1 | 2 | 3 | 4 | 1 | 2 | 3 | 4 |
| tensile strength at room temperature (kgf/mm$^2$) | 1.88 | 1.97 | 2.89 | 3.06 | 2.56 | 3.02 | 3.11 | 3.32 |

TABLE 2-continued

|  | Example | | | | Comparative example | | | |
|---|---|---|---|---|---|---|---|---|
|  | 1 | 2 | 3 | 4 | 1 | 2 | 3 | 4 |
| elongation (%) at room temperature | 577.02 | 545.54 | 545.95 | 674.56 | 687.93 | 597.16 | 471.56 | 403.94 |
| tensile strength after heated (kgf/mm$^2$) | 1.92 | 2.37 | 3.16 | 3.16 | not measura-ble (melted) | 3.18 | 3.98 | 5.21 |
| elongation (%) after heated | 501.23 | 541.67 | 533.39 | 628.30 |  | 337.76 | 241.95 | 158.15 |
| brittle temperature (° C.) | −50.5 | <−60 | −44.5 | <−60 | <−60 | −36.5 | −17.5 | −15.5 |
| flexibility | good | good | good | good | good | bad | bad | bad |

As shown in Table 2, in Examples 1 to 4 to which an insulating composition according to the present disclosure was applied, all room-temperature mechanical properties, heat resistance, thermal stability, cold resistance, flexibility, etc. were excellent when a peak ratio, a flexural modulus, and xylene insolubility were accurately controlled.

However, in Comparative Example 1, the amount of propylene was insufficient due to a low peak ratio of an insulating composition and thus a melting point Tm was low, thus greatly reducing heat resistance; and in Comparative Example 2, xylene insolubility of an insulating composition was greater than a reference level and thus the amount of a rubbery component was low, thus greatly reducing cold resistance, flexibility, etc., and elongation after heated was significantly low due to an unstable state of a resin.

In Comparative Examples 3 and 4, a peak ratio and a flexural modulus of an insulating composition was greater than reference levels or all the peak ration, the flexural modulus, and xylene insolubility were greater than reference levels, and thus heat resistance, cold resistance and flexibility were significantly low.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. An insulating composition comprising a heterophasic polypropylene resin,
wherein, in the heterophasic polypropylene resin, a rubbery propylene copolymer is dispersed in a crystalline polypropylene matrix,
wherein an insulating sample formed of the insulating composition has a flexural modulus of 50 to 1,200 MPa at room temperature, measured according to the ASTM D790 standard, and tensile strength of 1.27 kg/mm$^2$ or more and elongation of 350% or more, measured according to the KS C IEC 60811-501 standard, wherein the insulating sample formed of the insulating composition and heated at 135±3° C. for 240 hours according to the NEN-HD 620 S2 standard has tensile strength of 1.27 kg/mm$^2$ or more and elongation of 350% or more, wherein the insulating sample formed of the insulating composition has a brittle temperature of −35° C. or less, measured according to the ASTM D746 standard, and wherein a peak ratio of a propylene monomer is in a range of 0.3 to 2.0 according to the following Equation 1 and xylene insolubility is in a range 10% or less according to the following Equation 2:

peak ratio=peak of CH$_3$ symmetric bend/peaks of CH$_2$ and CH$_3$ bends,     [Equation 1]

wherein the peak of CH$_3$ symmetry bend represents a peak value of an absorption rate with respect to the CH$_3$ symmetry bend between 1400 cm$^{-1}$ and 1340 cm$^{-1}$, which are wave numbers indicating a propylene monomer in an FT-IR analysis of the insulating composition, and the peaks of CH$_2$ and CH$_3$ bends represent peak values of absorption rates with respect to CH$_2$ and CH$_3$ bends between 1500 cm$^{-1}$ and 1420 cm$^{-1}$, which are wave numbers respectively indicating an ethylene monomer and a propylene monomer in the FT-IR analysis of the insulating composition, and xylene insolubility=(mass of insulating sample after eluted with xylene solvent/mass of insulating sample before eluted)×100,     [Equation 2]

wherein the mass of insulating sample after eluted with xylene solvent represents mass of an insulating sample, measured after 0.3 grams of the insulating sample is immersed into a xylene solvent, heated at a boiling point or higher for six hours, cooled to room temperature, taken out of the xylene solvent, dried in an oven at 150° C. for four hours, and cooled to the room temperature.

2. The insulating composition of claim 1, wherein the peak ratio of the propylene monomer according to Equation 1 above is in a range of 0.4 to 1.7.

3. The insulating composition of claim 2, wherein the xylene insolubility according to Equation 2 above is 8% or less.

4. The insulating composition of claim 3, wherein the flexural modulus is in a range of 200 to 1,000 MPa.

5. The insulating composition of claim 1, wherein the crystalline polypropylene matrix comprises at least one of a propylene homopolymer and a propylene copolymer.

6. The insulating composition of claim 1, wherein the rubbery propylene copolymer comprises at least one comonomer selected from the group consisting of ethylene and C$_{4-12}$ alpha-olefins such as 1-butene, 1-pentene, 4-methyl-1-pentene, 1-hexene, 1-heptene, 1-octene, and the like.

7. A power cable comprising a conductor and an insulating layer surrounding the conductor, wherein the insulating layer is formed of the insulating composition of claim 1.

8. The insulating composition of claim 1, wherein the tensile strength is up to 3.06 kg/mm$^2$ when measured according to the KS C IEC 60811-501 standard.

9. The insulating composition of claim 1, wherein the brittle temperature is less than −44.5 degrees Celsius.

\* \* \* \* \*